UNITED STATES PATENT OFFICE.

CHARLES T. HARRIS, OF NEW BRUNSWICK, NEW JERSEY.

IMPROVEMENT IN VULCANIZING CAOUTCHOUC.

Specification forming part of Letters Patent No. 27,798, dated April 10, 1860.

*To all whom it may concern:*

Be it known that I, CHARLES T. HARRIS, M. D., of New Brunswick, in the county of Middlesex and State of New Jersey, have discovered or invented a new and useful Means of Curing India-Rubber and Analogous Gums, such, for example, as gutta-percha; and I do hereby declare that the following is a full, clear, and exact description of the same.

My invention or discovery consists in the combination of the gum to be cured with sulphide of bismuth prior to heating the same to a temperature at which curing takes place.

The sulphides of bismuth which I have used with success in practicing my invention are the artificial tersulphide of bismuth and an artificial polysulphide of bismuth. The former may be prepared in any way known to chemists and described in works upon chemistry—as, for example, by adding a solution of an alkaline sulphide to a solution of a salt of bismuth; or by passing a current of sulphureted-hydrogen gas through a solution of such salt. The polysulphide of bismuth may be prepared by adding a solution of the sulphide of lime (prepared as hereinafter described) to a solution of a salt of bismuth, which solution has been previously diluted with water and neutralized as nearly as possible. The process by which I have obtained this polysulphide is by dissolving metallic bismuth in commercial nitric acid in a close vessel connected with a receiver. When the solution is completed I add thereto a large quantity of water—say ten ounces to each ounce of acid solution—having previously poured into the solution a small quantity of acetic acid—say one-twentieth of an ounce to each ounce of acid solution—to prevent a precipitation of the oxide of bismuth. I then neutralize the acid solution as nearly as possible (using a test-paper to determine the point of neutralization) by any convenient alkali—such, for example, as the carbonate of soda—after which I add to the neutral solution a strong solution of the polysulphide of calcium (sometimes called the sulphuret of lime) prepared by boiling equal parts, by weight, of quicklime and sulphur in a close vessel. The resulting precipitate, which is the polysulphide of bismuth, is separated from the solution by filtration, and is dried at a temperature of 212° Fahrenheit in hot air. It is then ground fine and is ready for use. When thus prepared it resembles the tersulphide in being a heavy black powder.

The sulphide of bismuth which I prefer to use in practicing my invention is the polysulphide above mentioned; but whichever sulphide of bismuth be used, it should be ground to a fine powder before combining it with the gum to be cured. The powdered sulphide is then mixed intimately with the gum to be cured by grinding the two thoroughly together in the hot roller-mill commonly used in manufactories of india-rubber and gutta-percha for grinding these gums with other materials.

The proportions in which the two materials are combined may be varied according to circumstances. The degree of heat to which the compound is subjected, and the length of time that the heat is maintained, may also be varied as found expedient; but it is not possible to give a precise rule for regulating the proportions and the heat which will apply equally well to all cases which may occur in practice. I will therefore proceed to describe certain applications of my invention which I have made with success, leaving it to users to vary the proportions and the heat as circumstances may render expedient.

If the gum, when cured, is to be a soft article—similar to that of ordinary vulcanized rubber shoes—a good result may be obtained by grinding together one hundred parts, by weight, of india-rubber, seventy-five parts, by weight, of carbonate of lead, twelve and one-half parts, by weight, of polysulphide of bismuth. The compound, when thoroughly ground, may be spread upon cloth, in the manner practiced in rubber factories, and manufactured into articles of utility, or it may be molded into any desired shape previous to curing. The curing of the above compound may be effected by subjecting the articles in a suitable heater to hot air at a temperature of 245° of Fahrenheit's thermometer for one and a half hour.

I have also produced a good result by the following combination, viz: one hundred parts, by weight, of india-rubber, and ten parts, by weight, of polysulphide of bismuth. This compound, after being thoroughly ground and formed into articles of utility, may be cured by subjecting it, in a suitable heater, to the action of steam at a temperature of 245° for a period of from one and a half to four hours.

I have found by experiment that the proportion in which the sulphides of bismuth may be combined with the gum may be varied from six parts, by weight, of sulphide of bismuth for one hundred of gum to equal parts, by weight, of each. I have also found that curing will take place at a temperature as low as 210° in hot air and combined with carbonate of lead; but I do not consider this the best temperature, the temperature of 245° being that which I prefer.

When a hard material is desired a compound may be made by thoroughly grinding together equal parts, by weight, of india-rubber and the polysulphide of bismuth; and the articles formed of the compound may be cured in water-tanks in a steam-heater by subjecting the same for fifteen hours to a temperature of 300° of Fahrenheit's thermometer.

In curing by dry air I have thus far found it necessary, in order to produce good practical results, to combine the compound of gum and sulphide of bismuth with the carbonate of lead or with litharge. In curing by exposure to steam neither of these two additional substances are necessary; but these substances and others—such, for example, as the earths and oxides of the metals—may be combined by grinding with the compound of gum and sulphide of bismuth, as may be found expedient, either to lessen the cost of the articles manufactured or to impart to them certain desirable qualities.

I do not claim to be the first discoverer of a means of curing rubber or gutta-percha or analogous gums by combining one or more of them with other materials and subjecting the compound to heat; nor do I confine my claim to any particular proportions in which the materials are mixed, nor to any particular sulphide of bismuth; but

What I claim as my invention or discovery is—

The means, substantially as herein described, of curing india-rubber and analogous gums by combining them with an artificial sulphide of bismuth and heating the compound.

In testimony whereof I have hereunto subscribed my name.

CHAS. T. HARRIS.

Witnesses:
 DAVID G. BARNITZ,
 F. R. TAYLOR.